UNITED STATES PATENT OFFICE.

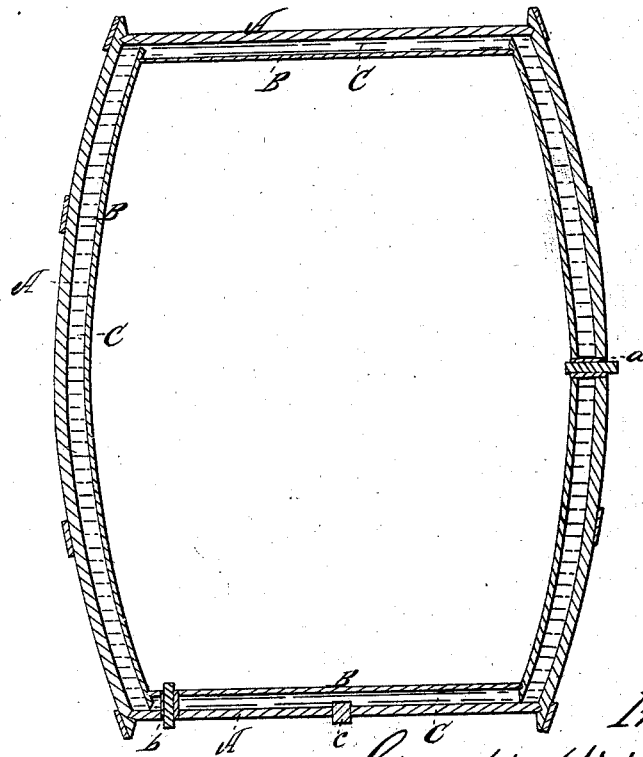

GEORGE W. WILLIAMSON, OF GOULDSBOROUGH, ASSIGNOR TO HIMSELF AND D. W. LEE, OF WILKES-BARRÉ, PENNSYLVANIA.

IMPROVED BARREL FOR HOLDING PETROLEUM.

Specification forming part of Letters Patent No. 49,202, dated August 1, 1865.

*To all whom it may concern:*

Be it known that I, GEORGE W. WILLIAMSON, of Gouldsborough, Luzerne county, in the State of Pennsylvania, have invented certain new and useful Improvements in Barrels, Tanks, &c., for the Storage and Transportation of Petroleum, Coal, or other Oils or Liquids; and I do hereby declare that the following is a full and exact description thereof, reference being had to the accompanying drawing, and to the letters of reference thereon marked.

In the drawing is shown a vertical section of a barrel made upon my plan for the storage of petroleum, benzine, or other liquids liable to evaporate and escape in large quantities through the common wooden barrel.

To enable others to make and use my invention, I will describe its construction and operation.

The object of my invention is to render wooden barrels, tanks, and other vessels or pipes tight enough to retain volatile fluids or oils without great waste from evaporation or leakage.

The nature of my invention consists in making barrels, tanks, cars, or other vessels or pipes with a double shell, having a space between them all around of a fourth of an inch or more, and filling this space with water containing in solution some substance such as chalk, starch, glue, or alum, so that the oil which is contained in the inner shell shall be surrounded and contained by the inner shell, by the water-space, and by the outer shell.

In the drawing, A represents the outer shell or barrel, and is of the size and shape in every respect of the common barrel. As all the wear and tear of transportation comes upon this barrel, it should be stout and well coopered.

B is the inner shell or barrel, and may be made of much thinner staves and heads, because it is supported internally and externally by fluid, so that no injury can occur to it.

C is the water-space between the two barrels. This space, between the sides of the two shells, is from one-fourth to one-half of an inch. Between the heads of the two shells it is about an inch, or the distance from the head of the inner barrel to the end of the staves. The height of the inner barrel is just equal to the internal height of the outer barrel, so that the ends of the staves of barrel B have their bearings against the inner surfaces of the heads of barrel A. A portion of the ends of several of the staves are cut away so as to make a water-connection all around the barrel B. The inner barrel is kept concentric with the outer barrel by means of suitable blocks or bearings between them.

*a* is the continuous bung, passing through both barrels and not connected with the water.

*b* is a similar continuous spile in the head of the barrel.

*c* is a plug in the head of the outer barrel, through which the solution is introduced.

The object and effect of the solution is at all times to keep both barrels thoroughly tight.

Instead of introducing mere water into the space C, as has been done heretofore, I use a solution not so susceptible of evaporation, or a solution which would serve to leave a hard deposit in the pores of the two barrels. A solution of starch, glue, chalk, alum, &c., in certain cases would be of advantage.

It is desirable that there should be little or no affinity between the fluid to be protected and the fluid in the space C.

The solution which fills the space C may vary greatly in its proportions without substantial difference. It has a threefold operation and character; and my invention exists where two or three of these three characteristics coexist and coact. First, there must be water to tighten the barrels by filling the pores; second, there must be glue or starch, or some similar substance insoluble in oil, to retard the evaporation of both the water and the oil; third, there must be chalk or other similar mineral matter to leave a hard deposit in the pores of the wood, and thereby still further assist in the prevention of evaporation. I may use eight parts of water to one of glue and one of chalk; or I may use eight of water and two of chalk, or eight of water and two of glue. The solution may vary considerably in its proportions.

Although my invention is more particularly adapted to vessels intended to contain petroleum and other oils, yet it is also admirably adapted to the purpose of packing and transporting valuable brandies and other liquors or chemicals.

Having thus fully described my invention, what I claim as new, and desire to secure by Letters Patent, is—

1. Filling the space between double barrels designed to contain petroleum or other volatile fluids with a solution composed of water, chalk, or its equivalent, and glue, or its equivalent, substantially as described.

2. With a solution composed of water and chalk or other mineral equivalent.

3. With a solution composed of water and glue, or other glutinous equivalent.

G. W. WILLIAMSON.

In presence of—
V. C. CLAYTON,
JO. C. CLAYTON.